(12) United States Patent
Balestri

(10) Patent No.: US 12,240,647 B2
(45) Date of Patent: Mar. 4, 2025

(54) BAG HANGER FOR CLEANROOM ENVIRONMENT

(71) Applicant: Veltek Associates, Inc., Malvern, PA (US)

(72) Inventor: Michael Balestri, Durango, CO (US)

(73) Assignee: Veltek Associates, Inc., Malvern, PA (US)

( * ) Notice: Subject to any disclaimer, the term of this patent is extended or adjusted under 35 U.S.C. 154(b) by 0 days.

(21) Appl. No.: 17/900,013

(22) Filed: Aug. 31, 2022

(65) Prior Publication Data

US 2023/0064018 A1 Mar. 2, 2023

Related U.S. Application Data

(60) Provisional application No. 63/333,640, filed on Apr. 22, 2022, provisional application No. 63/240,204, filed on Sep. 2, 2021.

(51) Int. Cl.
*B65B 67/12* (2006.01)
*B01L 1/04* (2006.01)

(52) U.S. Cl.
CPC ......... *B65B 67/1227* (2013.01); *B01L 1/04* (2013.01)

(58) Field of Classification Search
CPC ......... B65B 67/1227; B01L 1/04; B01L 9/00
See application file for complete search history.

(56) References Cited

U.S. PATENT DOCUMENTS

| | | | |
|---|---|---|---|
| 3,087,518 A * | 4/1963 | Scholle | B65B 3/28 141/315 |
| 3,192,894 A | 7/1965 | Staver | |
| 3,596,430 A * | 8/1971 | Parish | B65B 43/465 206/499 |
| 3,653,624 A * | 4/1972 | Abel | A61G 9/00 294/142 |
| 3,872,868 A * | 3/1975 | Kline | A61J 1/1462 248/688 |
| 4,278,225 A | 7/1981 | Phelps | |
| 4,415,085 A * | 11/1983 | Clarke | B29C 66/242 211/84 |
| 5,188,325 A * | 2/1993 | Hilty | A47F 7/06 211/32 |
| 5,257,957 A | 11/1993 | Diccianni et al. | |
| 5,339,952 A * | 8/1994 | Hecht | H01L 21/67363 206/706 |

(Continued)

FOREIGN PATENT DOCUMENTS

CN 210029987 U * 2/2020
CN 210644677 U * 6/2020

(Continued)

OTHER PUBLICATIONS

International Search Report & Written Opinion for PCT/US22/075761, dated Nov. 30, 2022, 17 pages.

*Primary Examiner* — Kimberly T Wood
(74) *Attorney, Agent, or Firm* — Blank Rome LLP

(57) ABSTRACT

A bag hanger has a main bracket body with a first leg configured for mounting the main bracket body on a support and a second leg extending from the first leg that is configured for hanging a bag. The second leg includes an open-ended slot that is accessible at a distal end of the second leg, the open-ended slot being sized to receive at least one hangable portion of the bag.

9 Claims, 5 Drawing Sheets

(56) References Cited

U.S. PATENT DOCUMENTS

| | | | |
|---|---|---|---|
| 5,882,602 A * | 3/1999 | Savage | B01L 3/0293 |
| | | | 422/537 |
| 6,045,097 A * | 4/2000 | Gaffar | A61M 1/1656 |
| | | | 211/85.15 |
| 6,131,779 A | 10/2000 | Gendala | |
| 6,152,408 A * | 11/2000 | O'Grady | B65B 67/1227 |
| | | | 383/33 |
| 7,530,537 B2 * | 5/2009 | Kandah | B65B 67/1233 |
| | | | 383/33 |
| 10,138,448 B2 | 11/2018 | Compo et al. | |
| 10,279,976 B2 | 5/2019 | Balestri | |
| 10,675,220 B2 * | 6/2020 | Okonski-Fernandez | |
| | | | A61B 50/362 |
| 10,934,039 B2 * | 3/2021 | Black | B65B 3/06 |
| 11,596,702 B2 * | 3/2023 | Boira Bonhora | A61L 2/087 |
| 11,655,058 B2 * | 5/2023 | Gay | B65B 31/02 |
| | | | 141/2 |
| 2005/0242122 A1 * | 11/2005 | Dyer | B65B 3/045 |
| | | | 222/179.5 |
| 2009/0161941 A1 * | 6/2009 | Nakanishi | G16H 20/17 |
| | | | 382/141 |
| 2016/0297082 A1 | 10/2016 | Hanley | |
| 2020/0085982 A1 | 3/2020 | Compo et al. | |
| 2021/0015706 A1 * | 1/2021 | Wabel | A61J 1/1475 |
| 2021/0284424 A1 | 9/2021 | Balestri | |

FOREIGN PATENT DOCUMENTS

| | | | | |
|---|---|---|---|---|
| DE | 102018103950 A1 * | 8/2019 | | A61J 1/10 |
| EP | 0540409 A1 | 5/1993 | | |
| JP | 2938645 B2 * | 8/1999 | | |
| JP | 4657434 B2 * | 4/2002 | | |
| JP | 2015197125 A * | 11/2015 | | |
| WO | WO-2012015552 A1 * | 2/2012 | | A61F 9/00736 |

* cited by examiner

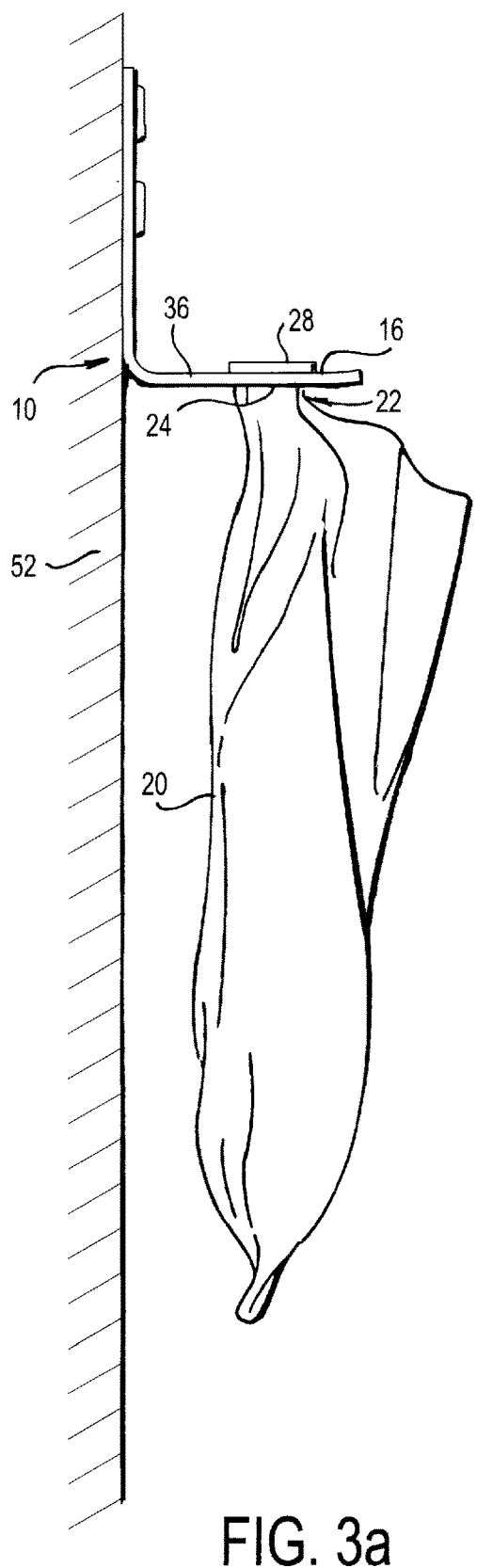
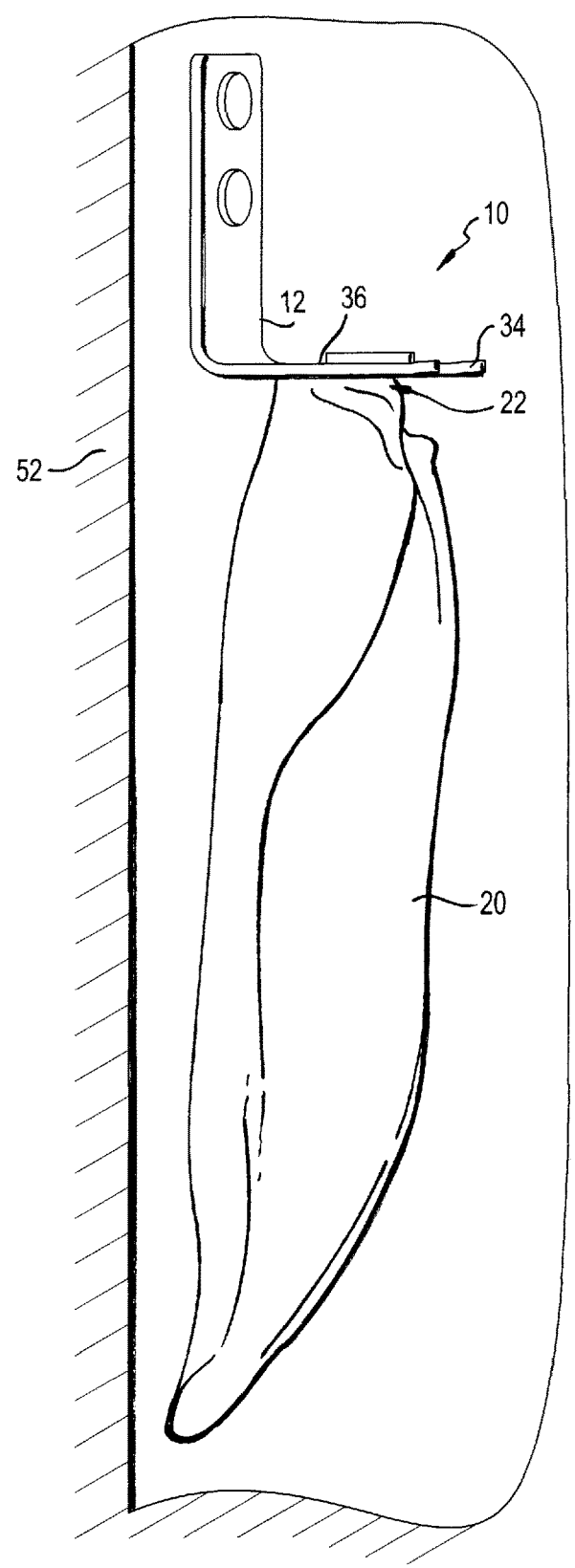
FIG. 3a
FIG. 3b

BAG HANGER FOR CLEANROOM ENVIRONMENT

RELATED APPLICATIONS

This application claims the benefit of priority of U.S. Provisional Application No. 63/240,204, filed on Sep. 2, 2021, and U.S. Provisional Application No. 63/333,640, filed Apr. 22, 2022, the content of which is relied upon and incorporated herein by reference in its entirety.

BACKGROUND

A clean environment is an area designed, maintained, and controlled to prevent particle and microbiological contamination of products. Clean environments include, for example, restricted access barrier systems (RABS), cleanrooms and isolators. There are different levels of cleanliness in clean environments, generally in the range of a Class 100 (i.e., having 100 particles of 0.5 micron and larger, per cubic foot of air), to a Class 10,000.

Clean environments are used for a variety of purposes, such as in the manufacture of pharmaceutical products and electronics, such as semiconductors. Often, clean environments are used to work on extremely expensive and complex products, and it is not unusual that there be millions of dollars of product in a clean environment at any given time. Clean environments have to maintain a high level of cleanliness, or risk large financial losses. If a product being developed or manufactured in a clean environment becomes contaminated, the entire product in the clean environment must often be discarded.

The U.S. Food and Drug Administration ("FDA") requires firms to assure that every element of the manufacturing environment and manufacturing process are proven to be acceptable to FDA requirements and industry standards. The FDA requires firms to operate in accordance with Current Good Manufacturing Practices (CGMP). To do this, firms are required to assure that products, personnel, training, ingredients, procedures and systems used in the manufacture of a drug product have undergone stringent testing. In light of the strict standards that clean rooms must satisfy, companies are very reluctant to introduce new products into their clean room that have not been extensively tested and proven reliable.

As shown in U.S. Pat. Nos. 10,279,976, 10,138,448, and U.S. Publ. Appl. No. 2020/0085982, and U.S. Publ. Appln. No. 2021/0284424, sterilizing wiper products have been developed that are used in clean environments. The wipers are contained in an enclosure such as a plastic bag, which can be sterilized prior to entry into the clean environment. The enclosure can then be opened inside the clean environment to dispense the wipers contained therein. Those references are hereby incorporated by reference in their entireties. However, those wiper products, as well as other product, are not readily retained in clean environments, and particularly in a RABS or isolator.

SUMMARY

The disclosure relates generally to a hanger and more particularly to a hanger for hanging a bag, such as when sterilizing and utilizing the bag in a clean environment. And, particularly for use in clean environments having more limited space or accessed by a user located outside of the clean environment, such as a RABS or isolator. This disclosure is further directed to a bag configured to be retained in the hanger.

The present disclosure relates to a bag hanger that comprises a main bracket body that has a first leg configured for mounting the main bracket body on a support and a second leg that extends from the first leg that is configured for hanging a bag. The second leg has an open-ended slot that is accessible at a distal end of the second leg. The open-ended slot is sized to receive at least one hangable portion of the bag.

In certain examples of the present disclosure, the main bracket body is a unitary one-piece member; the main bracket body is substantially L-shaped; the main bracket body has a substantially uniform thickness and width; the first leg includes one or more mounting holes; the open-ended slot is centered at the distal end of the second leg; and/or the main bracket body is formed of metal.

The present disclosure may also provide a bag hanger assembly that comprises at least one bag that has at least one hangable portion at one end thereof and a main bracket body. The main bracket body comprises a first leg configured for mounting the main bracket body on a support and a second leg extending from the first leg. The second leg has an open-ended slot that is accessible at a distal end of the second leg. The open-ended slot receives the at least one hangable portion of the bag, thereby hanging the bag from the main bracket body.

In one embodiment, the hangable portion of the bag is a valve with a neck and a head, the neck has a width smaller than a width of the open-ended slot and the head has a width that is larger than the width of the open-ended slot.

In another embodiment, the bag of the bag hanger assembly is for use in a clean environment.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIGS. 3a-3c are various perspective views of the hanger shown in FIGS. 1a-1e and 2, showing the hanger with a bag hung thereon;

DETAILED DESCRIPTION

Figure 1A:
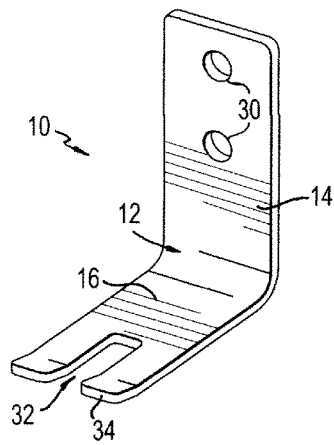
FIGS. 1a-1e are various views of a bag hanger in accordance with an exemplary embodiment of the present disclosure.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Referring to the figures, the present disclosure generally relates to a hanger or bracket 10 that is configured for hanging and suspending a product, and especially a container having an input/output port, e.g., a valve that forms an inlet or outlet for air, liquid or gas to the container. In one embodiment, the container 20 can be a bag or pouch. The design of the hanger 10 allows for easy hanging of the bag 20 and also easy retrieval of the bag 20 once hung on the hanger 10. The hanger 10 may be formed as a unitary one-piece member and can be formed of, for example, a rigid metal or other rigid material and, when used in a clean environment, readily sterilizable. In one embodiment, the hanger 10 is made of a corrosion resistant metal such as 316 stainless steel to further reduce contamination. In addition, the hanger 10 can be electro-polished to fill or reduce pore size so that it can be more readily sterilized and reduce contamination. Other suitable materials can be used, such as aluminum.

The hanger 10 can be used to retain items that are used inside a clean environment, for example, a container 20 that holds wipers saturated with a disinfectant (e.g., bleach) that is used to clean surfaces and product inside the clean environment. The hanger 10 allows for easily hanging of the bag 20 in the clean environment so that the bags 20 can be sterilized and used inside the clean environment.

Figure 6:
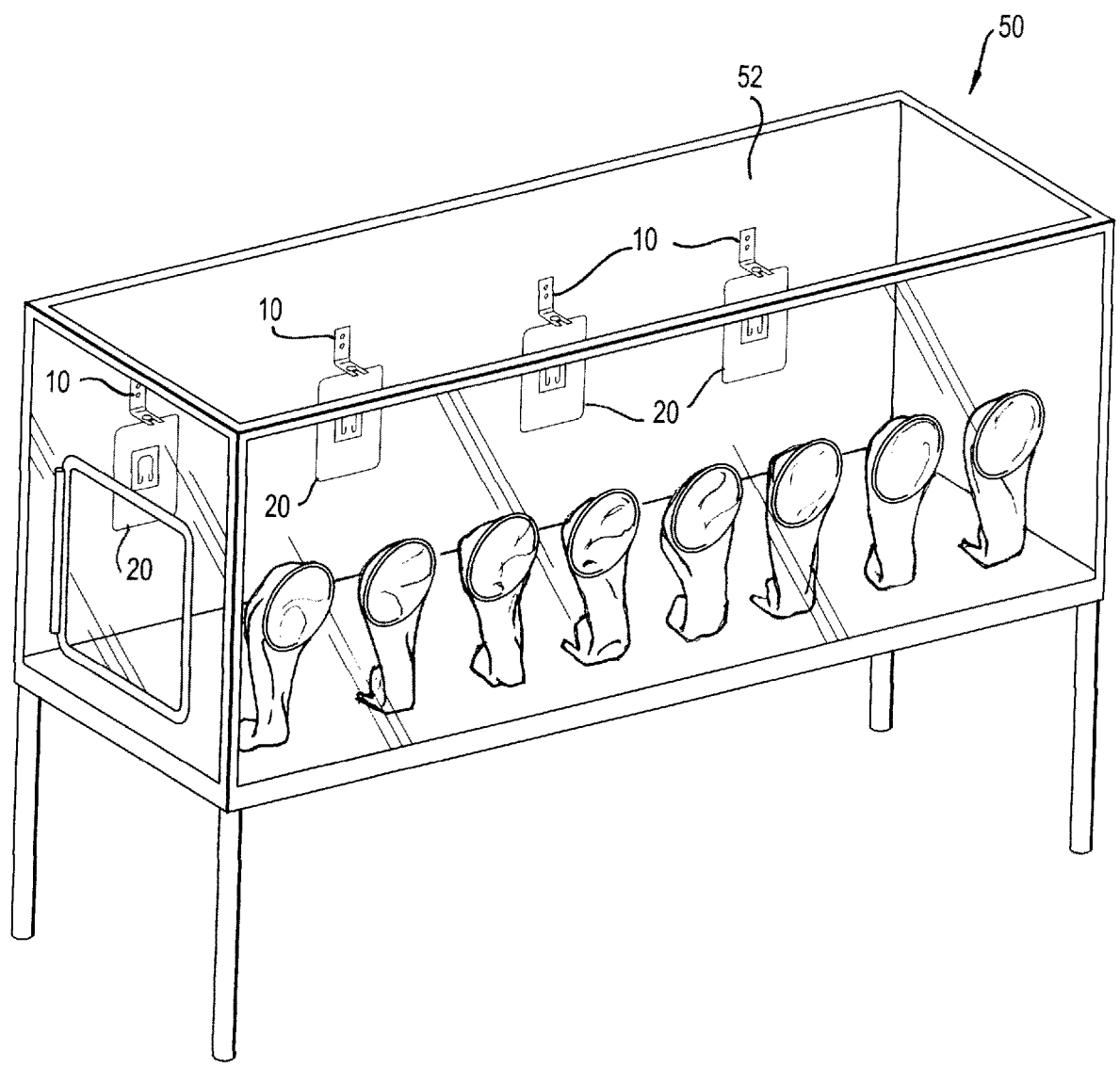
FIG. 6 shows the hanger in an isolator.

The hanger 10 comprises a main bracket body 12 that has a support mounting device and a product support device. The support mounting device is configured for mounting the main bracket body 12 on a support, such as a wall 52 of a cabinet, box, isolator 50 (FIG. 6), and the like. The support mounting device can be, for example, a first leg 14. The product support device is configured for hanging a product such as the bag 20. The product support device can be, for example, a second leg 16 that extends from the first leg 16 at an angle. In an example, the second leg 16 extends from the first leg 14 at a substantially orthogonal at a 90-degree angle such that the main bracket body 12 has a general L-shape. The first and second legs 14 and 16 can be substantially flat and have generally the same width and thickness such that the main bracket body 12 has a uniform thickness and width. The first and second legs 14 and 16 can have the same or different lengths. In the embodiment shown, the first and second legs 14, 16 are elongated and generally rectangular in shape.

Figure 5:
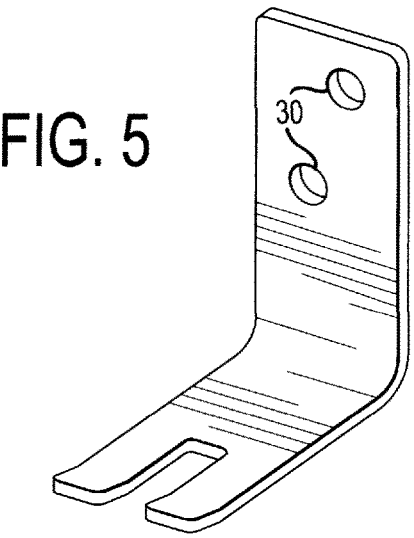
FIG. 5 shows another embodiment of the hanger.

The first leg 14 can have one or more mounting features 30 to mount the first leg 14 to the support. For example, the mounting features 30 can be one or more holes sized to receive a corresponding fastener, such as a mounting bolt or screw that pass through the holes into the support to fixedly secure the hanger 10 to the support. In other embodiments, a mounting hole is not provided but the hanger 10 can be attached to a wall (FIG. 3*a*) by, for example, a seal that is suitable for use in a clean environment. In the example embodiment of FIGS. 1*a*, 1*b*, 2, two holes are provided in the first leg 14. The holes are aligned vertically with one another. In the example embodiment of FIG. 5, the holes are offset with one another so that they are not vertically aligned. The offset embodiment provides greater support in the horizontal direction, for example to prevent side-to-side movement such as if the user inadvertently strikes the second leg 16. It will be recognized, however, that other embodiments for securing the hanger 10 to the support are within the scope of the present disclosure. For example, the support mounting device need not be an elongated member with openings. Instead, the support mounting device can be a strap, adhesive or other fastening mechanism that reliably and fixedly attaches the product support device to the support.

In one example embodiment, the support extends substantially vertically and the first leg 14 extends parallel to the support, i.e., substantially vertically in the present example, and is mounted to the support. The hanger 10 can be placed at any suitable location inside the clean environment. When utilized in a RABS or isolator 50, as shown for example in FIG. 6, the hanger 10 can be placed on a vertical wall 52 located directly opposite the glove ports so that the user can readily reach, through the glove ports, the hanger 10 and the bag 20 positioned on the hanger 10. The isolator wall 52 can be plastic (transparent or opaque), metal or other material. Or, the wall in a clean environment can be sheet rock, wood or other material. Accordingly, the user can open the bag 20 to access the wipers enclosed in the bag 20, close the bag, and also remove and replace the bag as may be necessary. Of course, the hanger can be positioned at any suitable location within the clean environment. In addition, more than one hanger can be located within the clean environment, though the hangers 10 should be sufficiently spaced apart so that the bags 20 do not touch one another so that the bags can be vapor sterilized once introduced into the clean environment, as more fully discussed below and shown for example in FIG. 6.

Figure 1B:
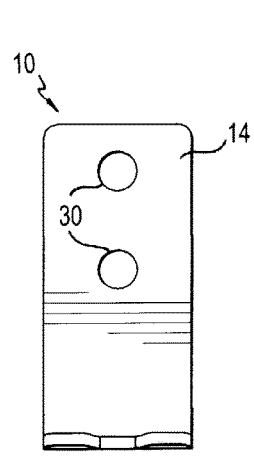
Figure 1C:
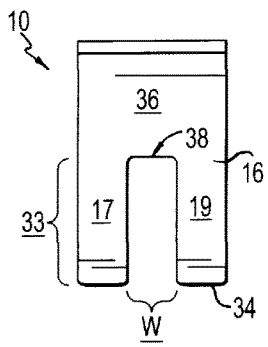
Figure 1D:
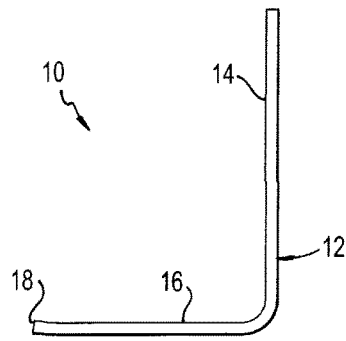
Figure 1E:
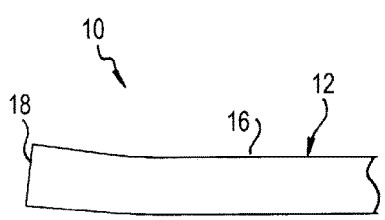
Figure 2:
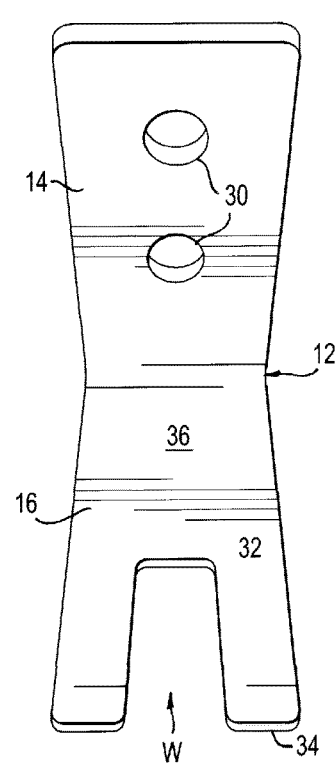
FIG. 2 is a perspective view of the hanger of the present disclosure.

In one example embodiment of the disclosure, the product mounting feature, i.e., the second leg 16, is designed to engage the bag 20 for hanging the same. For example, the product mounting device may have a mounting feature, for example an open-ended slot 32 with an open distal end and a proximal end 38. The slot 32 is accessible at the distal end 34 of a distal portion 33 of the second leg 16, as best seen in FIGS. 1*a*, 1*c*, and 2. The slot 32 may be generally centered at the distal end 34 of the second leg 16. Thus, the slot 32 extends from the distal end 34 of the second leg 16 at least partially inward toward the first leg 14, thereby forming a first elongated finger 17 and a second elongated finger 19 at a distal portion 33 of the second leg 16. In the embodiment shown, the slot 32 has a uniform width such that the inner sides of the fingers 17, 19 are substantially parallel to one another. However, in other embodiments the slot 32 can be tapered or stepped to be slightly wider at the open distal end and narrower at the proximal end, to readily receive a hangable portion 22 of the bag. In still further embodiments, as shown in FIG. 1*d*, the distal ends of the fingers 17, 19 can be angled upward slightly or as much as orthogonally to the top surface of the second leg 16 to form tabs 18. In one embodiment, the tab 18 is at an angle of approximately 15-45 degrees to the respective finger 17, 19, and more preferably at about 20 degrees to the respective finger 17, 19. It will be recognized that the product support device need not be an elongated member with a slot, but other suitable embodiments are suitable.

Figure 3C:
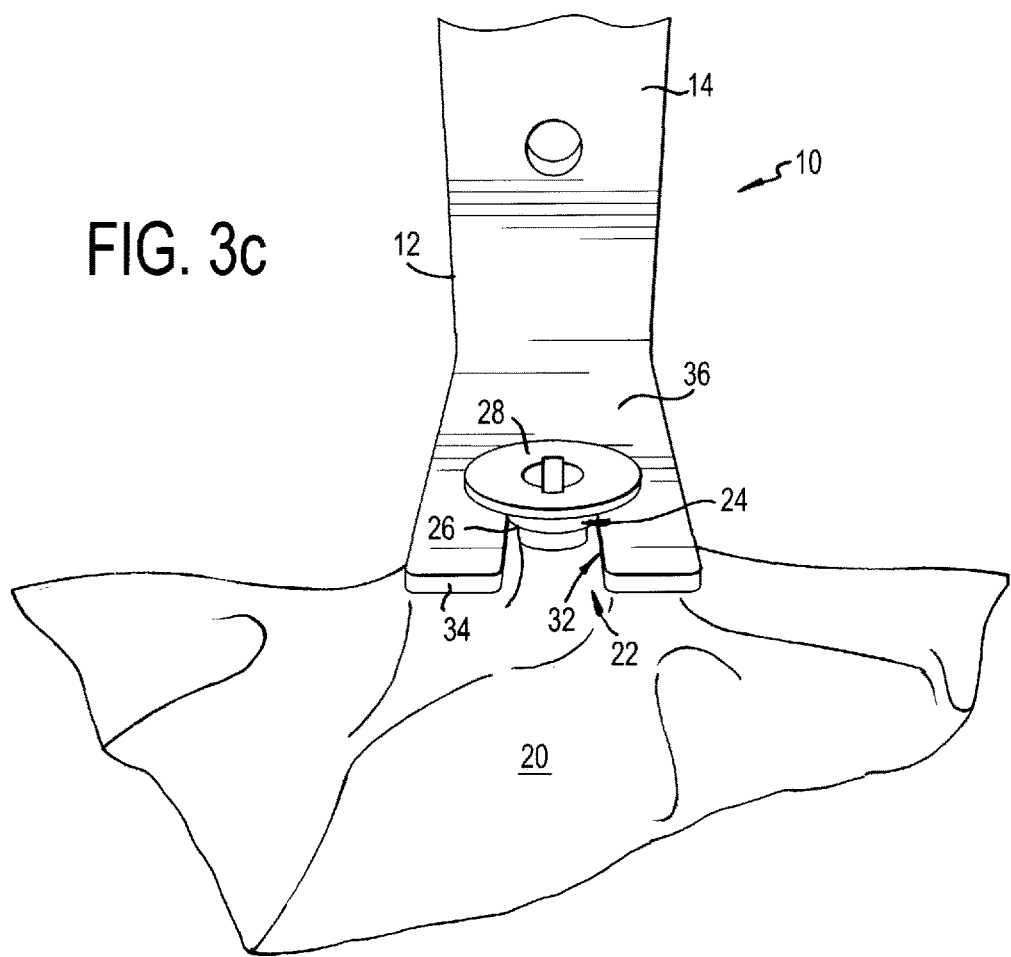

The open-ended slot 32 is sized to receive at least one hangable portion 22 of the bag 20, as best seen in FIG. 3*c*. The slot 32 is sized so that the hangable portion 22 can readily be slidably received in the slot 32. The slot 32 has a large enough gap so that there is not significant resistance as the hangable portion 22 is slidably received in the slot. But, the slot 32 is small enough to reliably hold the hangable portion 22. In addition, the slot 32 (and fingers 17, 19) are sufficient long so that the hangable portion 22 does not inadvertently fall out of the slot 32. In one embodiment, the length of the slot 32 is greater than the diameter of the hangable portion 22 and there is a preset distance from the hangable portion 22 to the tabs 18.

The hangable portion 22 of the bag 20 may be, for example, a valve 24 that has a neck 26 and a head 28. The valve 24 is securely and reliably affixed to the bag 20. The neck 26 of the valve 24 can have a width or diameter that is less than the width W (FIG. 1c) of the open-ended slot 32 such that the neck 26 can be received in the slot 32. The head 28 of the valve 24 can be wider than the neck 26 and wider than the width W of the slot 32 such that the bottom surface of the head 28 can rest on the upper surface 36 of the second leg 16 of the hanger 10 when the bag 20 is hung thereon, as seen in FIGS. 3a-3c. And because the slot 32 of the hanger 10 is open-ended at the distal end 34 of the second leg 16, the bag 20 can be easily placed on and removed from the hanger 10 by sliding the hangable portion 22 of the bag 20 in and out of the slot 34. The bag 20 can be fully received in the slot and come to a stop at the proximal end 38 of the slot 32. The proximal end 38 stops forward progress of the bag 20 when the hangable portion 22 (e.g., the head 28) contacts the proximal end 38. In some embodiments, the slot 32 can extend the entire length of the second leg 16, so that the bag 20 comes to rest when the bag contacts the support.

It is noted that the hanger can be utilized with suitable container 20, such as those shown in U.S. Publ. No. 2020/0085982, which is incorporated by reference in its entirety. In one embodiment, the containers 20 shown in FIGS. 3a-3c, 4a-4b are utilized.

In use, to introduce the bag 20 into a cleanroom, the wiper is placed between plastic layers and the layers are hermetically heat sealed to enclose the wiper. At the same time, a fill port 24, such as a one-way valve 24 is heat sealed to the plastic layers. The bag can be irradiation sterilized, then a disinfectant such as sterilized bleach can be aseptically filled into the bag through the valve or fill port 24. The bag can then be double bagged (successively enclosed in two bags that are each then hermetically sealed) and placed in a lined carton for delivery to the end user. On site, the user removes the double bags and places the container 20 inside the clean environment.

The user places the bag 20 on the hanger 10 inside the clean environment by sliding the neck 26 of the hangable portion 22 into the slot 32. When used in an isolator or RABS, the user opens the isolator and places the bag 20 on the hanger 10. The isolator can then be closed and sterilized (including the hanger 10 and the bags 20), such as by vaporized hydrogen peroxide (VHP) sterilization. Each hanger 10 holds a single bag 20 at a distance from the isolator wall so that the bag 20 does not touch the walls of the isolator. In particular, the proximal end 38 of the slot 32 is set at a predetermined distance from the first leg 14 so that the bag 20 cannot touch the wall of the isolator. The proximal end 38 prevents the neck 26 from moving beyond the predetermined distance when the neck 26 is fully received in the slot 32. In addition, when multiple hangers are provided, each hanger is separated so that the bags 20 do not touch each other. In those ways, the bags 20 hang freely and the vapor can completely surround and sterilize the entire bag 20.

Once the interior of the isolator is vapor sterilized, the user can access the bag 20 through the glove ports of the isolator. The user can then open the bag and retrieve the wipers saturated in cleaning solution, and use the wipers to clean a surface, equipment or product located inside the isolator. Once the bag is empty of wipers, the user can remove it from the hanger and place a new bag, or the empty bag can be replaced at the next cleaning cycle for the isolator.

In embodiments having raised tabs 18, the head 28 is lifted over the tabs 18 while sliding the bag 20 in and out of the slot 34. The tabs 18 prevent the head 28 of the hangable portion 22 from inadvertently coming free of the slot 34, such as if the bag is inadvertently bumped. It should be understood that the hangable portion 22 of the bag 20 can be any structure that can engage the second leg 16 of the main bracket body 12 for hanging the bag 20 therefrom. And although the second leg 16 of the hanger 10 is shown as supporting a single bag 20, the length of the second leg 16 can be extended to hold and hang multiple bags 20, depending on the application to be made.

Figure 4A:
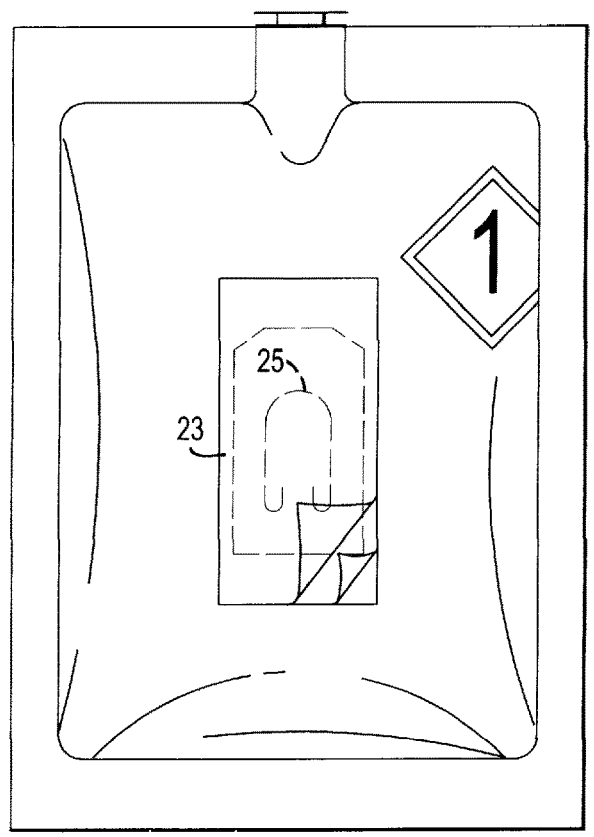
FIGS. 4a-4b show exemplary bags for use with the hanger.

FIG. 4a shows the bag 20 in more detail. The top layer of the bag 20 includes an opening and a cover 23, such as a press and seal cover, that surrounds or covers the opening. The cover 23 can have a pull tab or access tab 25 that the user can pull to open the cover to access the wipers contained inside the bag. The user can then remove a wiper through the opened cover and bag opening. Once a wiper is removed, the user can close the cover. As further illustrated, the cover 23 is positioned so that the user can open it with one hand. That is, the cover 23 is opened by pulling down on the access tab 25. Since the hanger is holding the bag 20 from the top end of the bag, the hanger 10 supports the bag as the user is pulling downward on the access tab 25.

The hanger 10 makes it easier for the user to remove wipers from the bag 20. When the bag 20 is installed on the hanger, the bag 20 hangs freely yet reliably on the hanger 10, without the user having to hold the bag 20. The user can then access the access tab 25 to easily open the cover 23. As the user pulls to remove a wiper, the tab 18 prevents the bag 20 from inadvertently coming off of the hanger 10. This is particularly useful since the user is wearing gloves, such as through a glove port on the isolator.

The proximal end 38 of the slot 32 also makes it easier for the bag 20 to be opened with one hand in the isolator. The proximal end 38 supports the valve 24 as the user is pulling downward on the access tab 25. Accordingly, the user can press inward (toward the first leg 14) on the bag as the access tab 25 is being opened, and forward motion is prevented by the proximal end 38 of the slot. The proximal end 38 of the slot can be at a predetermined distance from the first leg 14 to support that operation, and so that the bag has sufficient space to reliably hang on the hanger 10 without the hanger contacting the bag 20 or otherwise inadvertently pushing the bag 20 off of the hanger 10.

Figure 4B:
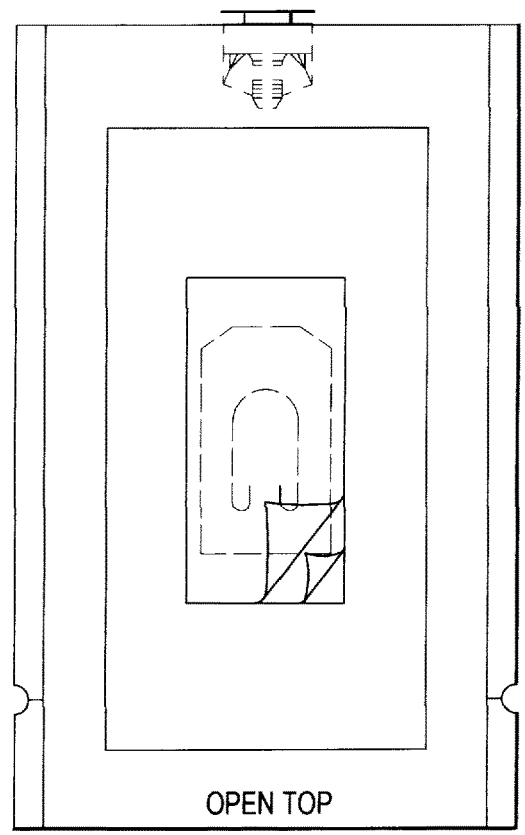

FIG. 4b shows another embodiment, the peel and seal cover 25 need not be provided. Instead, the user can access the wipe by having a notch or perforation in the side of the bag 20. Accordingly, the user can tear open the bag by pulling on the side of the pouch at the notch. Thus, in use, the technician pulls the bag along the perforation to tear the two layers of the pouch open to access the saturated wipe contained therein.

It is noted that the hanger is described for holding the bag 20 in a clean environment so that the bag can be readily vapor sterilized and the wipers can be readily retrieved by the user for use in the clean environment. However, it will be recognized that the hanger 10 can be utilized for any other suitable purpose. For example, the hanger 10 can hold the bag 20 as the bag is being aseptically processing the bag 20, such as to aseptically fill the bag 20 with a solution, such as a cleaning solution (e.g., bleach or alcohol). The hanger 10 makes it easier for the user to aseptically fill the bag 20 with the solution. When the bag 20 is installed on the hanger, the bag 20 hangs on the hanger 10 with the valve 24 facing upward so that it can be easily accessed by the user. The bag 20 hangs freely yet reliably on the hanger 10, without the user having to hold the bag 20. The user can then access the valve 24 with both hands, if necessary, to more easily fill the bag. This is particularly useful since the user is wearing gloves, such as through a glove port on the isolator. The hanger 10 makes it easier for the user to fill the bag with solution since the user can insert a tube into the valve and the hanger 10 cooperates with the head 28 to hold the valve in position at the top surface 36 of the second leg 16.

The proximal end 38 of the slot 32 also makes it easier for the bag 20 to be filled in the isolator by supporting the valve 24 as the user is filling it with solution. Accordingly, the user can press inward (toward the first leg 14) on the bag, and forward motion is prevented by the proximal end 38 of the slot. The proximal end 38 of the slot can be at a predetermined distance from the first leg 14 to support that operation, and so that the bag has sufficient space to reliably hang on the hanger 10 (when empty and when filled) without the support contacting the bag 20 or otherwise pushing against the bag that might otherwise inadvertently push the bag 20 off of the hanger 10. Once the bag is filled, the user slides it off of the hanger and places a new bag on the hanger for aseptic processing.

It is noted that the hanger 10 is shown and described for use in an isolator. However, other suitable uses can be made, such as in any area, room or location, whether or not a clean environment.

It is further noted that in one embodiment shown and described, the hangable portion 22 is a valve that is used to attach the bag 20 to the hanger 10. In addition, the valve 24 can be used to fill (aseptically) solution into the bag 20 onto the wiper. However, it will be recognized that the hangable portion 22 need not be a valve, but can be a fastening device that does not permit solution to be aseptically filled into the bag. And, the hanger and hangable portion need not have the shape shown, but rather the hanger can comprise a first fastening mechanism and the hangable portion can comprise a second fastening mechanism that releasably engages the first fastening mechanism, whereby the bag can hang freely by the first and second fastening mechanisms.

It is also noted that the support mounting device and the product support device are shown and described as separate features of a single unitary body 12. However, the support mounting device and the product support device can be part of the same feature. For example, there can be a single leg 16 can include one or more mechanisms (such as openings or a fastening mechanism) to mount the second leg 16 to the support. In addition, while the support mounting device and the product support device are shown directly formed with one another, they can be indirectly formed with one or more intermediary members therebetween.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as such as L-shaped, down, downward, top, bottom, angled, elongated, parallel, orthogonal, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. An enclosed clean environment, comprising:
   an enclosed housing having a fixed vertical support;
   an L-shaped bag hanger assembly comprising:
      a first elongated leg extending substantially vertically with a top end portion with a top end, and a bottom end portion with a bottom end, said first leg having an inward facing surface positioned against the support;
      an opening at the top end portion of said vertical first leg;
      a fastening device passing through said opening and into said vertical support to fixedly mount said bag hanger assembly to said vertical support with said inward facing surface of said first leg in contact with said vertical support;
      a second elongated leg integral with said first leg and extending orthogonally outward from the bottom end of said first leg to form the L-shape, the second leg having a top surface extending substantially horizontally, wherein said second elongated leg has a first elongated finger with a first inner side and a second elongated finger with a second inner side, and wherein said first inner side is parallel to said second inner side; and
      an open-ended slot formed in and accessible at a distal end of the second elongated leg between the first inner side of said first elongated finger and the second inner side of said second elongated finger, the open-ended slot being sized to receive at least one hangable portion of the bag to vertically hang the bag.

2. The clean environment of claim 1, wherein said support comprises a wall.

3. The clean environment of claim 1, wherein said clean environment comprises a restricted access barrier system, cleanroom and/or isolator.

4. The clean environment of claim 1, further comprising a plurality of bag hanger assemblies spaced apart from each other to permit sterilization of said plurality of bag hanger assemblies.

5. The clean environment of claim 1, wherein the first leg, the second leg and the slot are each elongated.

6. The clean environment of claim 1, the distal end of the second leg angled upward.

7. The clean environment of claim 1, the distal end configured to engage the bag and retain the bag on the second leg.

8. The clean environment of claim 1, wherein said first leg is fixedly positioned with respect to said second leg.

9. The clean environment of claim 1, said enclosed housing having an access panel with an opened position to grant access to an interior of said enclosed housing, and a closed position to deny access to the interior of said housing.

* * * * *